United States Patent [19]
Hampton

[11] Patent Number: 5,234,088
[45] Date of Patent: Aug. 10, 1993

[54] PHASE CHANGE DEVICE WITH SPLITTER SPRING

[75] Inventor: Keith Hampton, Ann Arbor, Mich.

[73] Assignee: Eaton Corporation, Cleveland, Ohio

[*] Notice: The portion of the term of this patent subsequent to Jan. 7, 2009 has been disclaimed.

[21] Appl. No.: 742,572

[22] Filed: Aug. 8, 1991

Related U.S. Application Data

[63] Continuation of Ser. No. 584,232, Sep. 19, 1990, abandoned.

[51] Int. Cl.$^5$ .............................. F01L 1/34; F16D 3/10
[52] U.S. Cl. ............................. 192/44; 123/90.15;
123/90.17; 192/41 R; 192/45.1; 464/1
[58] Field of Search ............... 192/43.2, 44, 41 R,
192/45, 45.1; 74/395; 123/90.15, 90.17; 464/1,
160; 474/900

[56] References Cited

U.S. PATENT DOCUMENTS

| | | | |
|---|---|---|---|
| 3,685,499 | 8/1972 | Meacham et al. | 123/90.15 |
| 3,721,220 | 3/1973 | Garcea | 123/90.15 |
| 4,177,773 | 12/1979 | Cribbs | 464/1 X |
| 4,672,825 | 12/1986 | Bruss et al. | 464/2 |
| 4,703,840 | 11/1987 | Bopp | 192/106.1 X |
| 4,841,924 | 6/1989 | Hampton et al. | 74/395 X |
| 4,872,427 | 10/1989 | Gustafson | 123/90.16 |
| 4,892,178 | 1/1990 | Damon et al. | 192/106.1 X |
| 5,002,023 | 3/1991 | Butterfield et al. | 123/90.15 |
| 5,046,460 | 9/1991 | Butterfield et al. | 123/90.15 |
| 5,056,477 | 10/1991 | Linder et al. | 123/90.17 |
| 5,056,478 | 10/1991 | Ma | 123/90.17 |
| 5,056,479 | 10/1991 | Suga | 123/90.17 |
| 5,078,647 | 1/1992 | Hampton | 464/1 |

FOREIGN PATENT DOCUMENTS 0438720 7/1991 European Pat. Off. .

Primary Examiner—Rodney H. Bonck
Attorney, Agent, or Firm—P. S. Rulon

[57] ABSTRACT

Devices (10 and 100) for varying the rotational phase relation between a camshaft (12) and an unshown crankshaft in response to positive and negative torque pulsations. The devices include double-acting one-way clutches (24 and 106) disposed in series with support and drive members (20,22 and 102,104) for selectively retarding and advancing the camshaft relative to the crankshaft in response to the torque pulsations. If none of the torque pulsations go negative due to relatively high constant torque, a splitter spring (30) may be disposed in parallel with the one-way clutches.

20 Claims, 4 Drawing Sheets

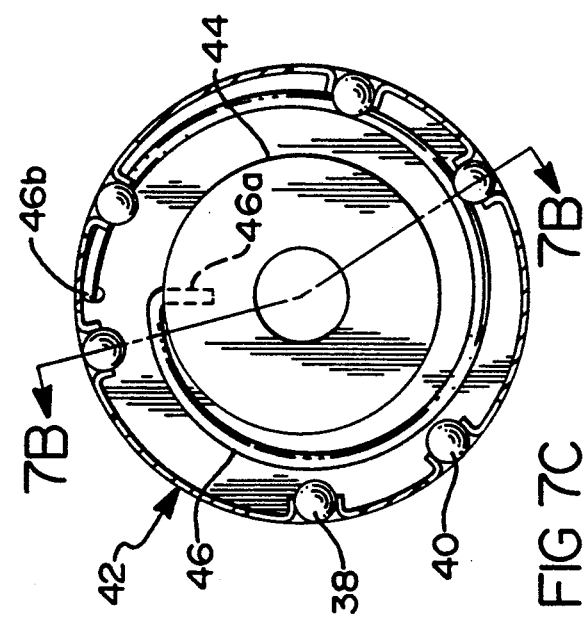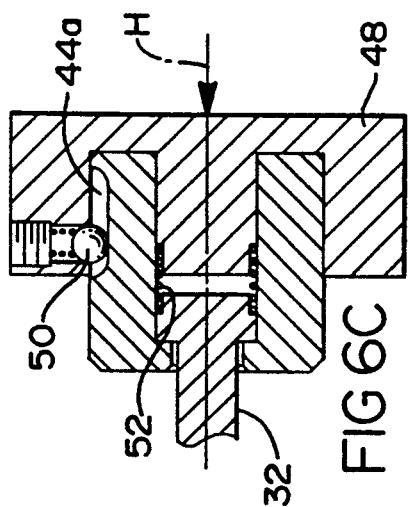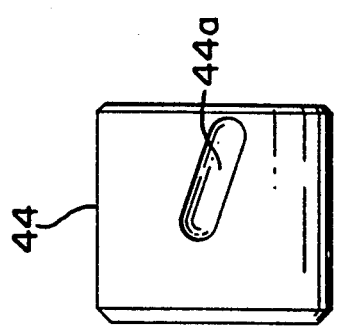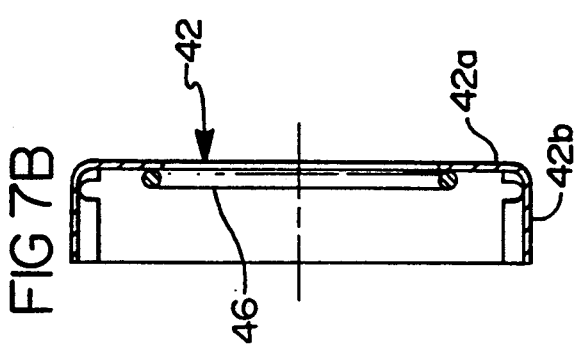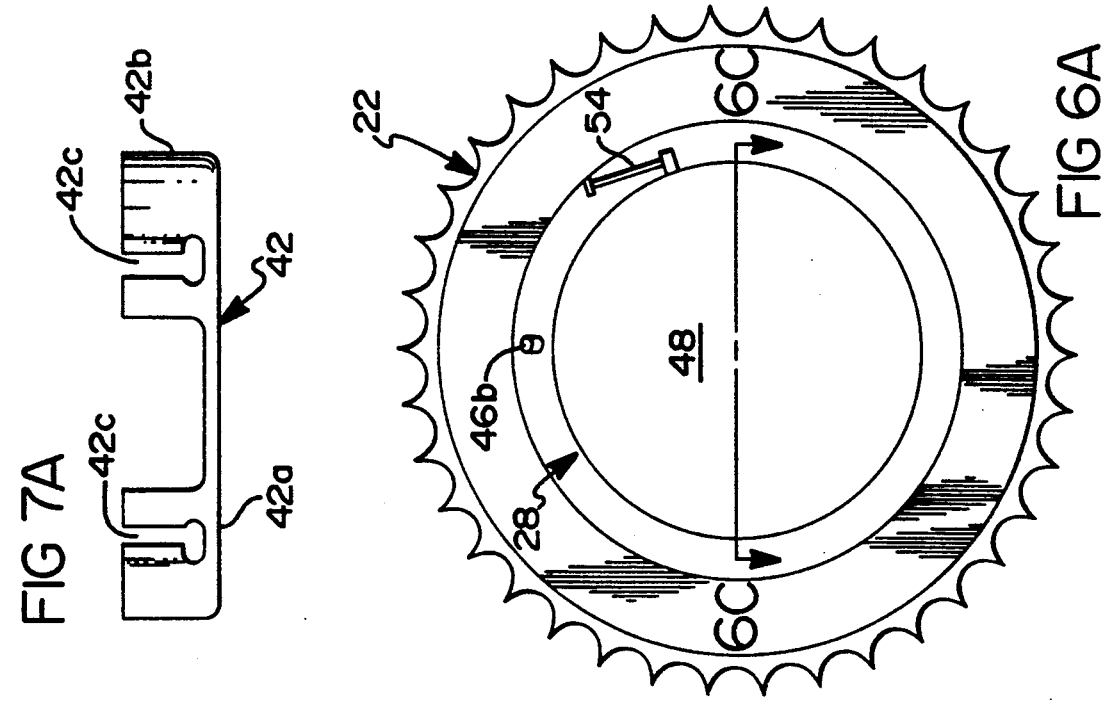

PHASE CHANGE DEVICE WITH SPLITTER SPRING

This is a continuation of copending application Ser. No. 584,232, filed on Sep. 19, 1990, now abandoned.

CROSS-REFERENCE

This application is related to U.S. application Ser. No. 07/584,233, filed Sep. 19, 1990 (now U.S. Pat. No. 5,078,647) filed and assigned to the assignee of this application.

FIELD OF THE INVENTION

This invention relates to a device for varying the angular phase relation between two rotating members. More specifically, the invention relates to such a device adapted to vary the angular phase relation between a camshaft and a crankshaft of an internal combustion engine.

BACKGROUND OF THE INVENTION

Devices for varying or changing the angular phase relation or timing between an engine camshaft and crankshaft are well known, as may be seen by reference to U.S. Pat. Nos. 3,626,720 and 4,754,727 which are both assigned to the assignee of this patent and which are both incorporated herein by reference.

The U.S. Pat. No. 3,626,720 to Meachem et al includes a helical ball spline mechanism for varying the phase relation in response to selective porting of engine oil pressure to axially displace a piston therein.

The U.S. Pat. No. 4,754,727 to Hampton discloses a device including an axially displaceable advancing plate drivingly interconnecting support and drive members via straight and angular lugs or splines. The advancing plate is threadably mounted on a drum for axial displacement along the drum in response to relative rotation between the drum and plate. Relative rotation in one direction is provided by a spring reacting between the hub and drum, and in the other direction by selective application of a frictional force for retarding rotation of the drum counter to the spring force.

As is known, the above mentioned phase change devices vary valve timing to improve engine operation. However, the above devices and other such devices have certain disadvantages which have prevented or limited their use in mass production. For example, they tend to be difficult to package in the space normally available, they tend to have prohibitive mechanical complexity, they tend to be unreliable, or they tend to be difficult to control.

SUMMARY OF THE INVENTION

An object of the present invention is to provide a phase change device with means for utilizing torque pulsations to effect advancing and retarding the phase changes.

Accordingly to a feature of the invention, a phase change device is provided for coupling and selectively advancing and retarding the rotational phase relation between first and second members of a driveline driven by a torque. The torque has a portion of substantially constant positive value in one direction and a cyclic portion due to mechanisms periodically actuated by the second member. The cyclic portion relative to the constant portion has positive pulses which add to the constant value and negative pulses which subtract from the constant value. The device includes phase change means disposed in series with the first and second members and selectively operative to effect the advancing and retarding.

The improvement is characterized by spring means disposed in series with the first and second member and in parallel with the phase change device means. The spring means is preloaded for applying a torque in the direction of rotation of the second member. The spring means transmits or substantially transmits the constant portion of the torque and thereby substantially reduces torque in the phase change means to the cyclic portion of the driveline torque.

SUMMARY OF THE INVENTION

An object of the present invention is to provide a phase change device which mitigates or removes all of the above objections.

According to a feature of this invention, a device is provided for coupling and selectively advancing and retarding the rotational phase relation between first and second rotatable members. The improvement is characterized by advance and retard one-way clutches interposed between the first and second member; the advance and retard clutches are alternately positionable to operative states for respectively effecting the advancing and retarding in response to negative and positive torque pulsations respectively across the advance and retard clutches.

BRIEF DESCRIPTION OF THE DRAWINGS

The phase change devices of the present invention are shown in the accompanying drawings in which:

FIG. 6A, is a relief view of the device looking in the direction of arrow 6 in FIG. 1 and FIGS. 6B and 6C portions of the device, shown in FIGS. 1 and 6A;

FIGS. 7A, 7B and 7C, illustrate three different views of a component in the device;

DETAILED DESCRIPTION OF THE DRAWINGS

Figure 1:
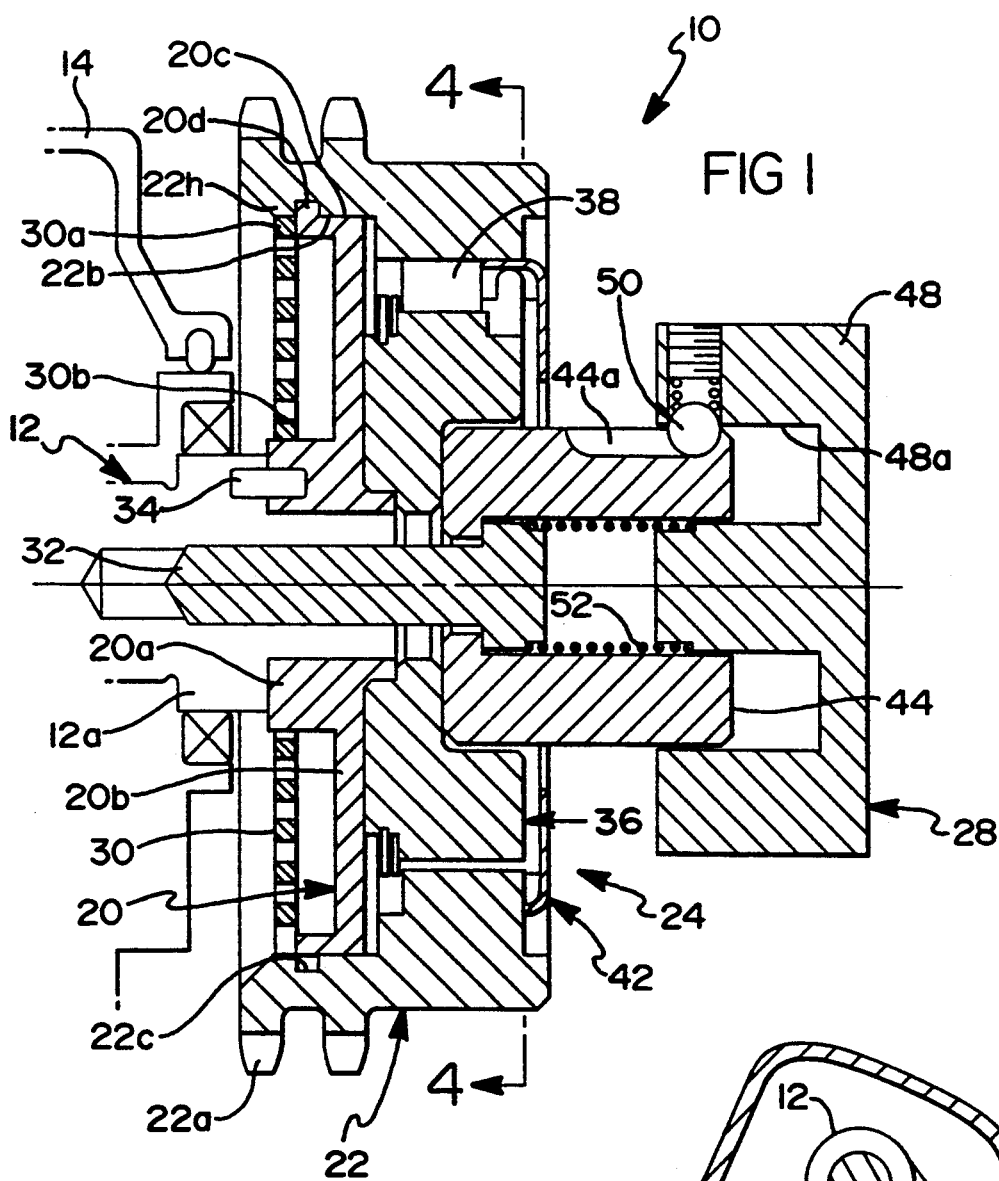
FIG. 1, is a cross-sectional view of one of the devices looking along line 1—1 of FIG. 4.
Figure 2:
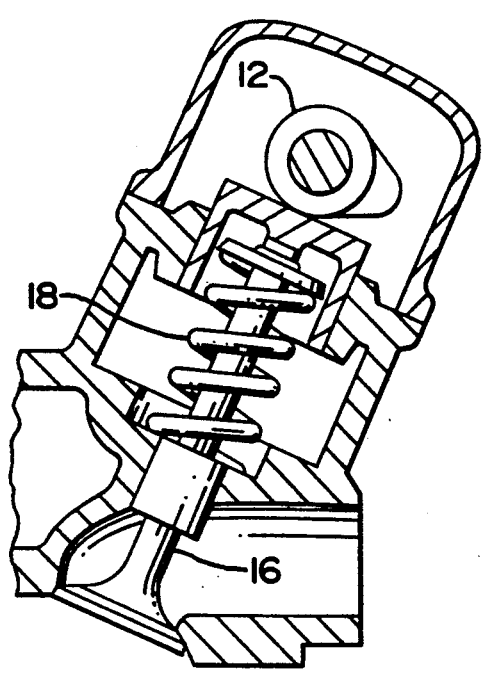
FIG. 2, is a sectional view of a portion of an engine.

Looking now at FIGS. 1-7, therein is shown an angular phase change device 10 adapted to be fixed to and rotate about the axis of a camshaft 12 of an internal combustion engine partially outlined at 14 in FIG. 1 and partially shown in the schematic of FIG. 2. The engine includes an unshown crankshaft which transmits torque for a valve gear driveline for rotating device 10 and camshaft 12 in a clockwise direction of arrow A in FIG. 4.

The camshaft controls periodic opening and closing of intake and/or exhaust valves 16 which are biased toward the closed position by springs 18 in known manner. The springs store energy provided by camshaft torque during valve opening and return stored energy during valve closing, thereby causing the camshaft torque to have a cyclic portion which adds to and subtracts from a substantially constant camshaft torque portion. The substantially constant torque is a positive torque in the direction of arrow A and is due to constant resistance to driveline rotation such a friction. The cyclic portions are, of course, due to valve openings and closings.

Figure 3:
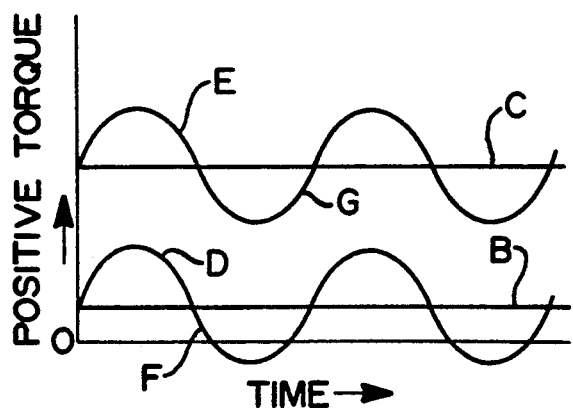
FIG. 3, is a graph illustrating camshaft torque in the engine.

The graph of FIG. 3 illustrates the effect of the cyclic torque pulsations in a driveline having a rather low constant torque represented by a constant torque curve B and in a driveline having a greater constant torque represented by a constant torque curve C. As is readily seen, the cyclic portion of the total torque curve for each driveline has a portion D,E which adds to the constant torque and a portion E,G which subtracts from the constant torque. The pulsations F,G associated with curve C remain positive over their amplitude. However, part of the pulsations D,F associated with curve B are negative. The phase change device herein utilizes the positive and negative portions of these pulsations to effect the phase changes. Further, when device 10 is applied to a driveline wherein parts of the torque pulsations are not negative, the device is provided with a splitter spring which bypasses all or a portion of the constant torque, whereby the torque pulsations have positive and negative portions with respect to the phase change mechanism of device 10.

Device 10 includes a driven support member 20, a drive or sprocket member 22, a double-acting roller clutch assembly 24, an actuator assembly 28, a retard spring 46 shown only in FIG. 7B, and a splitter spring 30 shown only in FIG. 1.

Support member 20 includes a hub portion 20a and a flange portion 20b extending radially outward from the hub portion. The flange portion includes an outer cylindrical surface 20c, a set of circumferentially spaced apart and radially extending ears 20d. The hub portion is axially fixed to an end 12a of the camshaft by a fastener such as a bolt 32 which prevents axial and rotational movement therebetween. The device is timed to the camshaft in known manner, herein a dowel pin 34 is used.

Drive member 22 is substantially annular in shape and is synchronously driven in fixed angular phase relation with the unshown crankshaft in known manner. Herein the drive is preferably via an unshown endless chain which mates with teeth 22a. The radially inwardly facing portion of the drive member includes a cylindrical surface 22b journaled on surface 20c of the flange portion, an annular groove 22c receiving ears 20d, three cylindrical arcs or race surface 22d defining the outer race of the roller clutch assembly, and three radially inwardly extending lugs 22e each defining a retard stop 22f and an advance stop 22g. The sidewalls of groove 22c prevent relative axial movement of support and drive members 20,22. Ears 20d gain access to groove 22c via unshown arcuate openings in groove end wall 22h.

Figure 4:
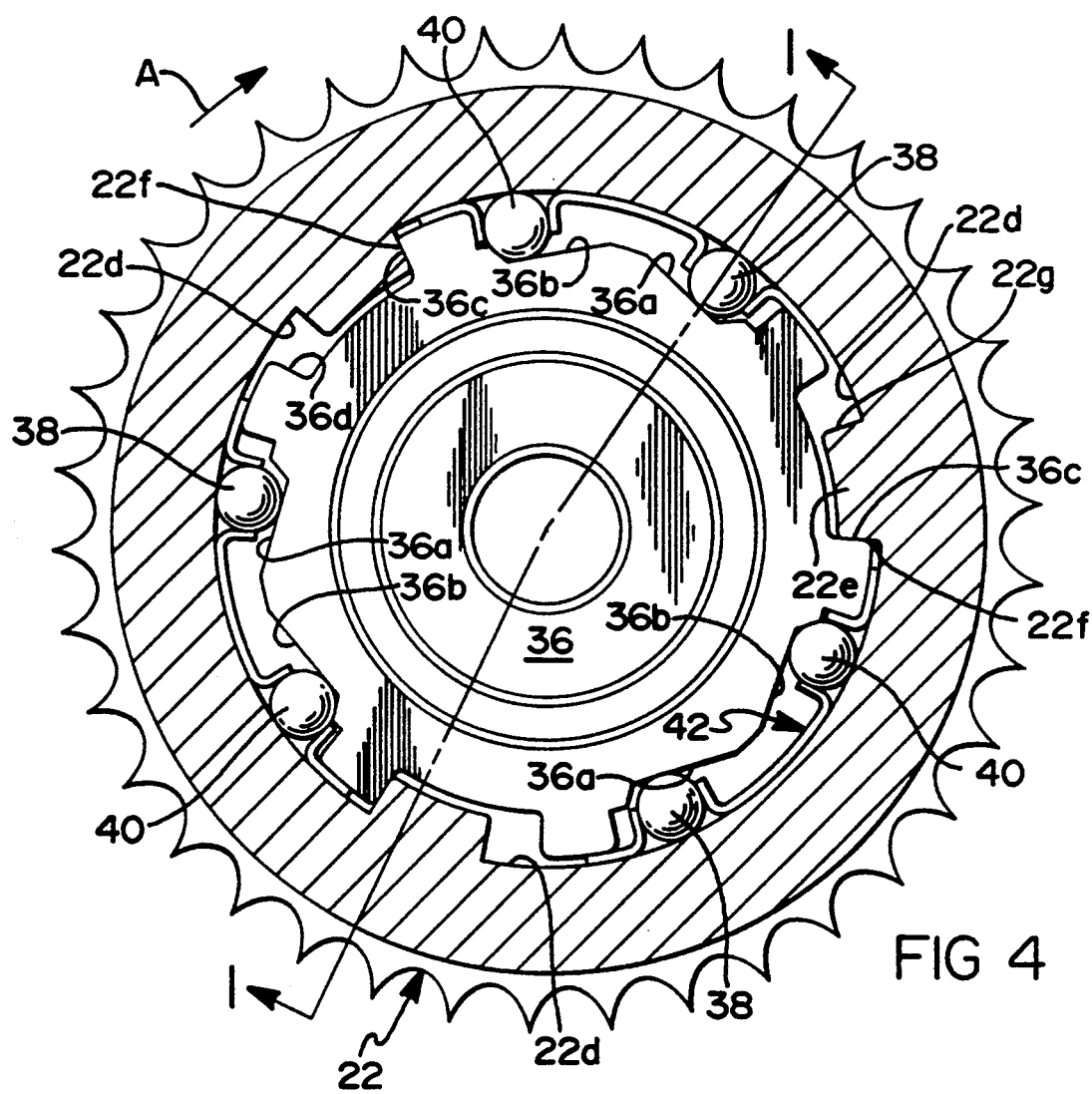
FIG. 4, is a cross-sectional view of the device looking along line 4—4 of FIG. 1.
Figure 5:
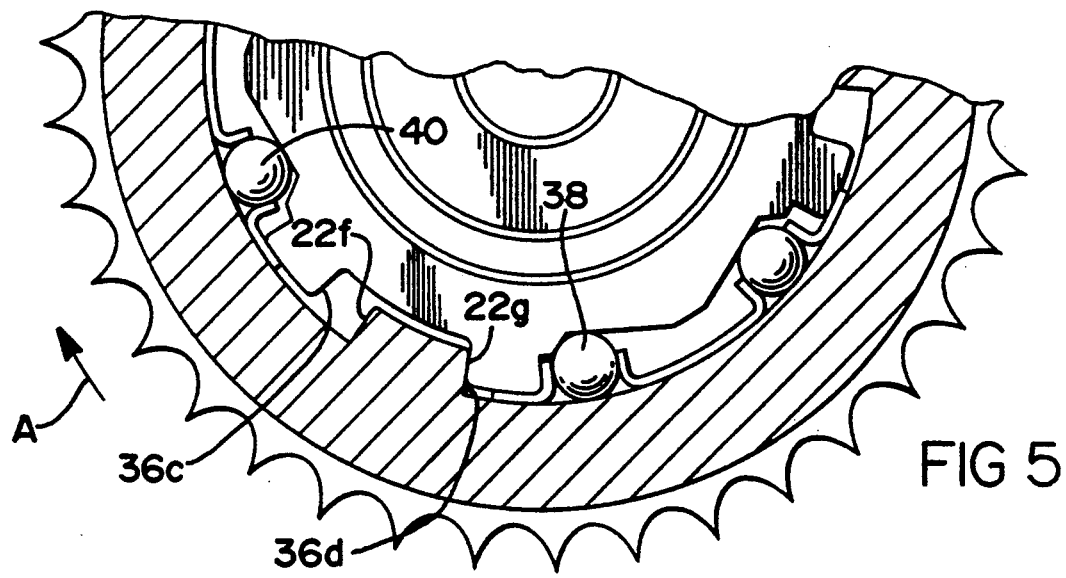
FIG. 5, is a partial view of the device in FIG. 4 with portions of the device in different operating positions.

Roller clutch assembly 24 includes the outer race defined by cylindrical arcs 22d, an inner member 36 affixed against rotation relative to support member 20, three retarding rollers 38, three advancing rollers 40, and a spider 42 shown in detail in FIG. 7. Inner member 36 includes three retarding ramps 36a, three advancing ramps 36b, three retard stops 36c, and three advancing stops 36d. The retarding and advancing ramps are grouped in three pairs. The radially inner extent or dwell portion of each ramp is spaced from race surfaces 22d a distance grater than the diameter of rollers 40. The radially outer extent or apex portion of each ramp is spaced from the race surfaces a distance less than the roller diameters. The stops 22f,36c and 22g,36d allow a predetermined maximum relative rotation between support and drive members 20,22. Herein, by way of example only, the relative rotation is ten degrees. Device 10 is in a fully retarded position in FIG. 4 and a fully advanced position in FIG. 5. In FIG. 4, the rollers associated with the advancing ramps 36b are in the dwell or inoperative positions and the rollers associated with the advancing ramps 36b are in the dwell or inoperative portions and the rollers associated with the retarding ramps 36a are wedged between the retarding ramps and the race surfaces. In FIG. 5, the dwell and wedging positions of the rollers are reversed.

Spider 42 includes a radially extending portion 42a and an axially extending portion 42b having three openings 42c freely receiving support member stop lugs 22e to allow limited rotation of the spider relative to drive member 22 from the retarding position of FIG. 4 to the advancing position of FIG. 5, and two sets of three roller pockets to maintain the rollers in fixed circumferentially spacing relative to each other.

Actuator assembly 28 includes a cylindrical member 44 affixed against axial and rotational movement relative to roller clutch inner member 36 via the bolt 32, a spiral spring 46 having ends 46a,46b connected to spider 42 and member 44, and an axially movable member 48 having a cylindrical recess 48a slidably receiving the free end of member 44. Spring 46 biases spider toward the retarding position of FIG. 4, i.e., counterclockwise relative to drive member 22. Members 44,48 are interconnected for limited axial and rotational movement relative to each other via a ball 50 affixed to member 48 and partially received in a helical groove 44a in the outer surface of member 44. Member 44 is rotated ninety in FIG. 6B to better show groove 44a. A coil spring 52 biases members 44,48 axially apart to the position of FIG. 1, which corresponds to the retarding position of the spider in FIG. 4. A link 54 connects member 48 to the spider. Member 48 is moved to the position of FIG. 6C by a force H from an unshown and selectively actuated mechanism. The position of FIG. 6C corresponds to the advancing position of FIG. 5. Ball and helical groove 44a force member 48 to rotate clockwise relative to member 44 in response to the axial movement of member 48 from the position of FIG. 1 to the position of FIG. 4. Such relative clockwise rotation also rotates spider 42 to the advancing position of FIG. 5 via link 54. Alternatively, spiral spring 46 could bias spider 42 to the advancing position and axial movement of actuator member 48 by force H would move the spider to the retarding position.

Splitter spring 30 is affixed at its radially outer and inner ends 30a,30b to drive member 22 and support member 20. Herein the splitter spring is of the spiral type; however, other types of springs or resilient means may be used. Spring 30 biases support member 20 and camshaft 12 in the clockwise direction with a preload substantially corresponding to the constant torque required to overcome friction and drive of any components other than valves 16 driven by the camshaft. Accordingly, spring 30 provides the torque path between member 22,20 for constant torque and the roller clutch assembly provides a parallel torque path for the cyclic torque pulsations. In engines having sufficiently low constant torque and torque pulsations which are at least in part negative, splitter spring 30 may be deleted.

During engine operation with spider 42 biased counterclockwise and remembering that device 10 normally rotates in the clockwise direction of FIG. 4, advance rollers 40 are inoperative since they are in the dwell or inoperative positions between races 22d and advancing ramps 36b, and retarding rollers 38 are operative since they are in a wedging relation between races 22d and retarding ramps 36a. The positive portions of the cyclic torque pulsations tend to rotate drive member 22 clockwise relative to inner race 36, such relative rotation is unopposed by advancing roller 40 since they are in the inoperative or dwell positions and is also unopposed by retarding rollers 38 since the direction of relative rotation is in the nonwedging direction of retarding ramps 36a. The negative portion of the cyclic torque pulsations tend to rotate drive member 22 counterclockwise relative to inner race member 36. Such relative rotation is now in the wedging direction of retarding ramps 36a and is therefore prevented.

If during engine operation with device 10 in the retarding position a control system senses a need to advance the camshaft relative to the crankshaft, spider 42 is rotated clockwise to the advancing position of FIG. 5 to render retarding rollers 38 inoperative and advancing rollers 40 operative in response to the force H moving actuator member 48 axially to the position of FIG. 6C. With spider 42 in the advancing position, the positive portion of the cyclic torque pulsations still tends to rotate drive member 22 clockwise relative to inner race 36; such relative rotation is now in the wedging direction of advancing ramps 36b and is now prevented by the wedging of rollers 40 between ramps 36b and races 32d. The negative portions of the cyclic torque pulsations still tend to rotate drive member 22 counterclockwise relative to the inner race 36; such relative rotation is now unopposed by the retarding rollers 40 since they are in the inoperative or dwell positions and is also unopposed by advance rollers 40 since the direction of relative rotation is in the nonwedging direction of advancing ramps 36b.

The magnitude and duration of the torque pulsations, particularly the negative pulsations, determine how quickly device 10 moves between the retarding and advancing positions. For example, when spider 42 is moved to the advancing position, several negative pulsations may be necessary to effect the full advance position of inner member 36, i.e., each negative pulsation may only effect an incremental advance. Each incremental advance is maintained during the positive torque pulsation by the wedging action of rollers 40.

Figure 9:
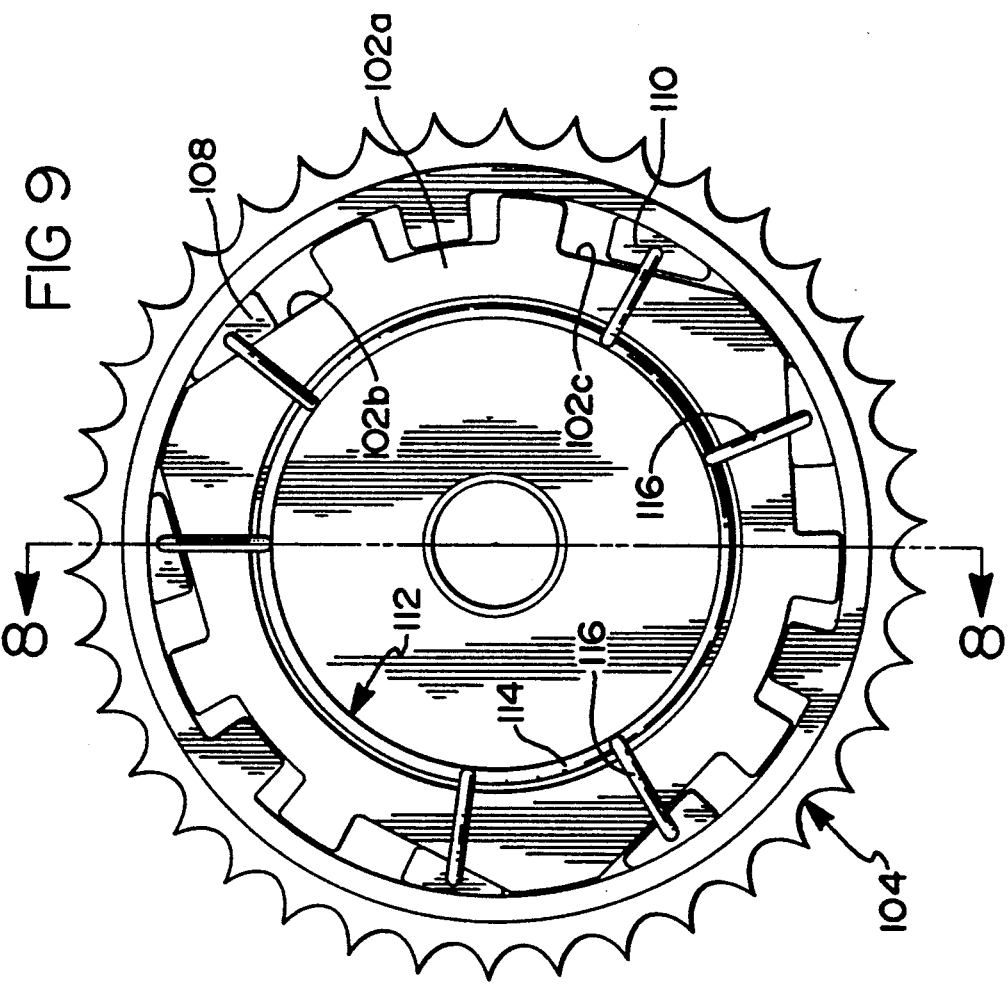
FIG. 9, is a relief view of the device looking in the direction of arrow 9 in FIG. 8.
Figure 8:
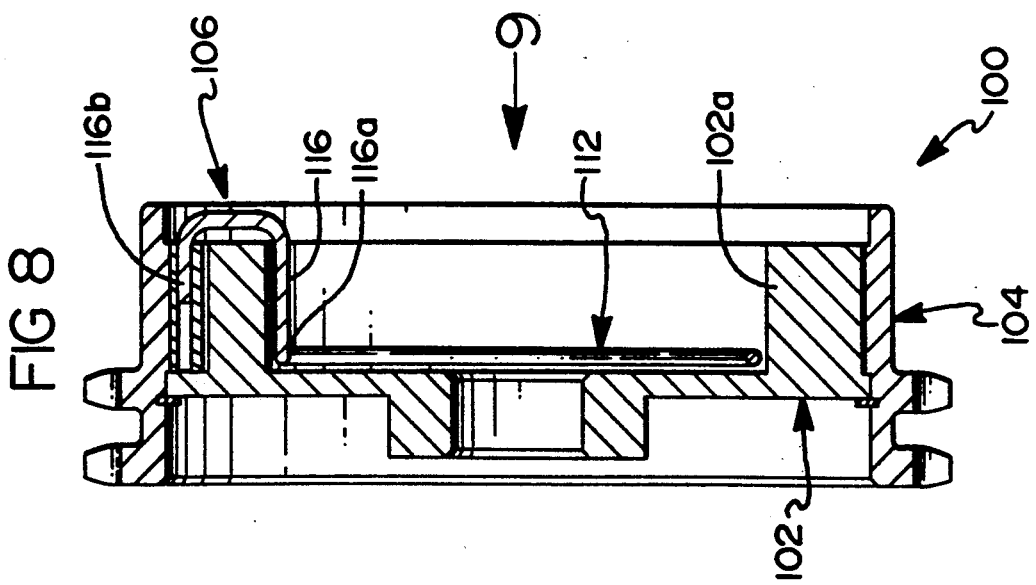
FIG. 8, is a cross-sectional view of an alternative embodiment of a portion of the device looking in the direction of line 8—8 in FIG. 9.

Referring now to FIGS. 8 and 9, therein is illustrated a phase change device 100 embodying the same principles of operation as device 10 with the main difference being with respect to the double-acting clutch assembly. Device 100 includes a support member 102, a drive member 104, and a double-acting clutch assembly 106. Support member 102 connectable to camshaft 12 in the same manner as illustrated in FIG. 1. Drive member 104 is journaled on the support member and driven by the unshown crankshaft. Device 100 may be actuated in the same manner as device 10 and may include a splitter spring such as splitter spring 30 in device 10. Clutch assembly 106 includes retarding and advancing wedges 108,110 in lieu of rollers 38,40, an inner member 102a formed integral with the support member, and spider formed of a wire frame 112. Timer member 102 defines retarding and advancing ramps 102b,102c. Spider frame 112 includes hoop portion 114 and a plurality J-shaped fingers 116 welded to the hoop at an end and 116a slidably received at the other end 116b in bores in the wedges. The wedges and spider frame are functionally the same as described for device 10.

Two embodiments of the invention have been disclosed for illustration purposes. Many variations and modifications of the disclosed embodiments are believed to be within the spirit of the invention. The following claims are intended to cover inventive portions of the disclosed embodiment and variations and modifications within the spirit of the invention.

What is claimed is:

1. A device for coupling and selectively advancing and retarding the rotational phase relation between first and second rotatable members of a driveline driven by a torque, the torque having a portion of substantially constant positive value in one direction and a cyclic portion due to mechanisms periodically actuated by the second member, the cyclic portion relative to the constant portion having positive pulses which add to the constant value and negative pulses which subtract from the constant value; the device including phase change means disposed in series with the first and second members and selectively operative to effect the advancing and retarding; characterized by:

spring means disposed in series with the first and second members and in parallel with the phase change means, the spring means being preloaded for applying a torque in the direction of rotation of the second member.

2. The device of claim 1, adapted for rotation in one direction about an axis common to the first and second members and wherein the phase change means includes:

advance and retard one-way clutch means and selector means for positioning each clutch means in inactive and active states, each clutch means when in the inactive state being unresponsive to the negative and positive torque pulsations during rotation of the members in the one direction, the advance one-way clutch means operative during the active state thereof and during the rotation in the one direction for preventing the retarding rotation in response to the positive torque pulsations and for allowing the advancing rotation in response to the negative torque pulsations, and the retard one-way clutch means operative during the active state thereof and during the rotation in the one direction for preventing the advancing rotation in response to the negative torque pulsations and for allowing the retarding rotation in response to the positive torque pulsations.

3. The device of claim 1, including:

stop means for limiting the advancing and retarding rotational phase relation.

4. The device of claim 1, wherein the first and second members are adapted for rotation in one direction about a common axis and wherein the phase change means includes:

advance and retard one-way clutch means and selector means for moving advance and retard wedge means of the one-way clutch means between inactive and active wedging states, the wedge means when in the inactive state being unresponsive to the negative and positive torque pulsations during rotation of the members in the one direction, the advance wedge means operative during the active state thereof and during the one direction of rotation to prevent retarding rotation of one of the members relative to another of the members in response to the positive torque pulsations and to allow advancing rotation of the one member relative to the other member in response to the negative pulsations, the retard wedge means operative during the active state thereof and during the one direction of rotation to prevent advancing rotation of the one member relative to the other member in response to the negative pulsations and to allow retarding rotation of the one member relative to the other member in response to the positive pulsations.

5. The device of claim 4, wherein the one-way clutch means further includes spider means responsive to the selector means for moving the advance and retard wedge means between the active and inactive states and spring means for biasing the spider means in one rotational direction for positioning one of the sets of wedge means in the active state and the other set of wedge means in the inactive state.

6. The device of claim 5 wherein:
the selector means for moving the spider means counter to the spring means and thereby positioning the other set of wedge means in the active state and the one set of wedge means in the inactive state.

7. The device of claim 6, including
stop means for limiting the advancing the retarding rotational phase relation.

8. The device of claim 4, wherein the advance and retard wedge means respectively include sets of advance and retard rollers, and the one-way clutch means further including spider means responsive to the selector means for moving the rollers between the active and inactive states and spring means biasing the spider means in one rotational direction for positioning one of the sets of rollers in the active state and the other set of rollers in the inactive state.

9. The device of claim 8, wherein:
the selector means for moving the spider means counter to the spring means and thereby positioning the other set of rollers in the active state and the one set of rollers in the inactive state.

10. The device of claim 9, including:
stop means for limiting the advancing and retarding rotational phase relation.

11. A device disposed in an engine four coupling and selectively advancing and retarding the rotational phase relation between a crankshaft and a camshaft, the device including first and second rotatable members respectively driven in phase with the crankshaft and camshaft and transmitting a torque therebetween, the torque having a portion of substantially constant positive value in one direction and a cyclic portion due to mechanisms periodically actuated by the second member, the cyclic portion relative to the constant portion having positive pulses which add to the constant value and negative pulses which subtract from the constant value; the device including phase change means disposed in series with the first and second members and selectively operative to effect the advancing and retarding; characterized by;
spring means disposed in series with the first and second members and in parallel with the phase change means, the spring means being preloaded for applying a torque in the direction of rotation of the second member.

12. The device of claim 11, adapted for rotation in one direction about an axis common to the first and second members and wherein the phase change means includes:
advance and retard one-way clutch means and selector means for positioning each clutch means in inactive and active states, each clutch means when in the inactive state being unresponsive to the negative and positive torque pulsations during rotation of the members in the one direction, the advance one-way clutch means operative during the active state thereof and during the rotation in the one direction for preventing the retarding rotation in response to the positive torque pulsations and for allowing the advancing rotation in response to the negative torque pulsations, and the retard one-way clutch means operative during the active state thereof and during the rotation in the one direction of preventing the advancing rotation in response to the negative torque pulsations and for allowing the retarding rotation in response to the positive torque pulsations.

13. The device of claim 12, including
stop means for limiting the advancing and retarding rotational phase relation.

14. The device of claim 11, wherein the first and second members are adapted for rotation in one direction about a common axis and wherein the phase change means includes:
advance and retard one-way clutch means and selector means for moving advance and retard wedge means of the one-way clutch means between inactive and active wedging states, the wedge means when in the inactive state being unresponsive to the negative and positive torque pulsations during rotation of the members in the one direction, the advance wedge means operative during the active state thereof and during the one direction of rotation to prevent retarding rotation of one of the members relative to another of the members in response to the positive torque pulsations and to allow advancing rotation of the one member relative to the other member in response to the negative pulsations, the retard wedge means operative during the active state thereof and during the one direction of rotation to prevent advancing rotation of the one member relative to the other member in response to the negative pulsations and to allow retarding rotation of the one member relative to the other member in response to the positive pulsations.

15. The device of claim 14, wherein the one-way clutch means further includes spider means responsive to the selector means for moving the advance and retard wedge means between the active and inactive states and spring means for biasing the spider means in one rotational direction for positioning one of the sets of wedge means in the active state and the other set of wedge means in the inactive state.

16. The device of claim 15, wherein:
the selector means for moving the spider means counter to the spring means and thereby positioning the other set of wedge means in the active state and the one set of wedge means in the inactive state.

17. The device of claim 16, including:

stop means for limiting the advancing and retarding rotational phase relation.

18. The device of claim 14, wherein the advance and retard wedge means respectively include sets of advance and retard rollers, and the one-way clutch means further including spider means responsive to the selector means for moving the rollers between the active and in active states and spring means biasing the spider means in one rotational direction for positioning one of the sets of rollers in the active state and the other set of rollers in the inactive state.

19. The device of claim 18, wherein:
the selector means is for moving the spider means counter to the spring means and thereby positioning the other set of rollers in the active state and the one set of rollers in the inactive state.

20. The device of claim 19, including:
stop means for limiting the advancing and retarding rotational phase relation.

* * * * *